Nov. 26, 1929.  D. A. MACE  1,737,166
DIRECTION SIGNAL SWITCH
Filed May 8, 1928   2 Sheets-Sheet 1

Inventor
Delos A. Mace

By Clarence A. O'Brien
Attorney

Nov. 26, 1929.                D. A. MACE                  1,737,166
                         DIRECTION SIGNAL SWITCH
                           Filed May 8, 1928            2 Sheets-Sheet  2
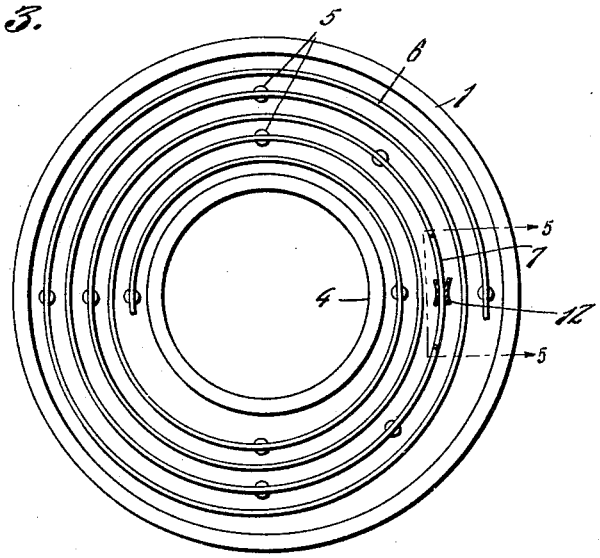
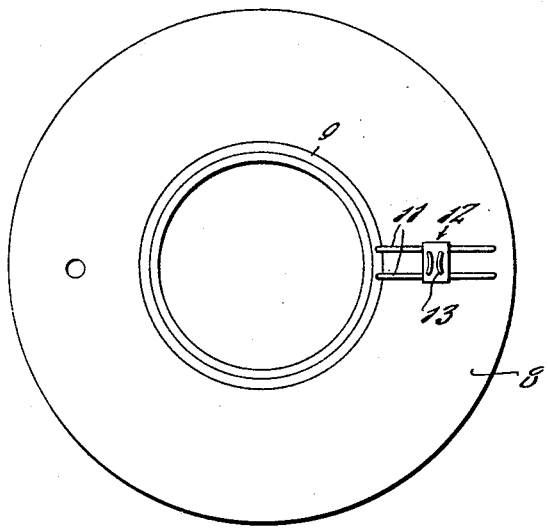
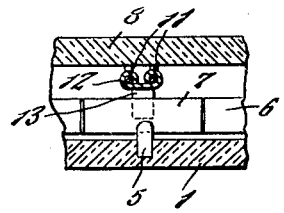
Inventor
Delos A. Mace
By Clarence A. O'Brien
                    Attorney Patented Nov. 26, 1929

1,737,166

UNITED STATES PATENT OFFICE

DELOS A. MACE, OF EUREKA, CALIFORNIA

DIRECTION-SIGNAL SWITCH

Application filed May 8, 1928. Serial No. 276,158.

The present invention relates to improvements in direction signals for automobiles, and includes novel switch means adapted for association with the steering wheel, whereby a visible signal will be given, denoting the direction that the driver intends to travel. Devices of this nature are known to exist, but because of their complicated construction, the cost of production is greater than the economic demand.

An important object of the invention is to provide an automatic switch means for association with the usual steering wheel of an automobile, whereby the direction signal will be given when the wheel is turned either to the right or left.

Another object resides in providing a switch device of this character, which may be easily mounted for use without altering any portion of the steering apparatus.

Other objects and advantages of this invention will become apparent from the following specification and claims.

In the drawings:

Figure 3 is a top plan view of the annular box containing the contact strip.

Figure 4 is a bottom view of the plate disclosed in Figure 2, the same illustrating the slidable contact door carried thereby.

Figure 5 represents a sectional fragmentary view, through the insulating plate and fire proof housing, disclosing the contacting member carried by the insulating plate in engagement with the insulating section of the contact strip.

Figure 1:
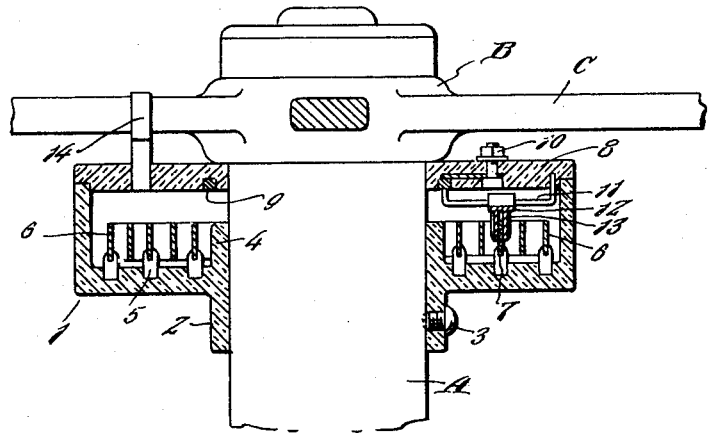
Figure 1 represents a sectional view through this novel switch device, mounted in association with the usual steering wheel of an automobile.
Figure 2:
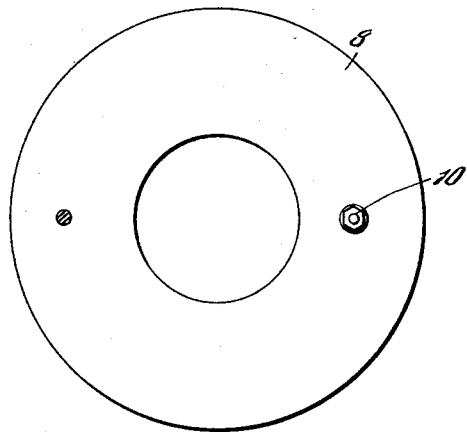
Figure 2 is a top plan view of the insulating plate rotated by the steering wheel.
Figure 6:
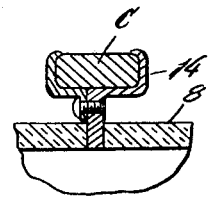
Figure 6 is a fragmentary sectional view disclosing the clamp means for securing the insulating plate to the spoke of the usual steering wheel.

Now for a more detailed description of this invention, reference is made to the drawings, wherein like numerals designate like parts. For the purpose of illustrating the manner in which this switch device is associated with an automobile, the usual steering column B is shown provided with the usual steering wheel C, which wheel is of the construction employing radiating spokes C.

A circular housing 1 constructed of insulated material is open at its top side and formed with an opening centrally through its bottom and through which the steering column A is adapted to project. The depending annular flange 2 encircles the opening at the bottom side of the housing 1 and is adapted to snugly engage the steering column A. A suitable set screw 3 threadable through this flange is adapted to bite into the column for securing the housing in predetermined relation with respect to the steering wheel B. An upstanding annular flange 4, on the bottom of the housing also encircles the central opening and prevents the engagement of the spiral contact strip with the metallic steering column, in the event of some distortion thereof, and which will be more specifically described hereinafter.

Projecting upwardly within the housing 1 is a plurality of rows of spaced stud members 5. These stud members are bifurcated at their upper ends for receiving an elongated spirally wound contact strip 6. This strip is provided with an intermediate section 7 of insulating material arranged in the manner disclosed by Figure 5.

The discular plate 8 is constructed of suitable insulating material and is formed at its center with an opening, so that the same may be disposed over the steering column A. An annular conductor ring 9 is arranged around the opening in the plate and has a suitable connection to a binding post 10 projecting from the top surface of the plate.

A pair of spaced U-shaped members 11—11 are adapted to have one of their leg portions secured to the conductor ring 9, while the opposite ends thereof are embedded in the discular plate.

A contacting brush 12 is constructed of a plate of material bent at its opposite end for loose engagement over the respective U-shaped members 11. The pair of spring contact fingers 13 depend from this plate and are adapted to engage at opposite sides of the insulating section 7 of the spiral contact strip, when the steering wheel is in a position denoting that the wheels of the vehicle are disposed in a straight forward position.

A two part clamp 14 upstanding from the plate 8 is adapted for connection to one of the spokes C of the steering wheel, so that the plate will rotate with the movement of the steering wheel.

Figure 7:
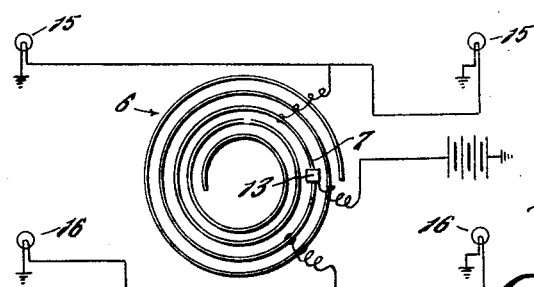
Figure 7 is a diagrammatic view of the circuit controlled by this novel switch means.

In Figure 7, the diagrammatic view, the spiral contacting strip 6 is shown. As before described, the length of this contacting strip is broken by a section of insulating material 7, with which the spring fingers 13 normally contact. The portion of the contacting strip extending from one end of the insulating section is connected in circuit with a pair of signal lights 15—15. When the contacts are moved beyond the insulating section and in contact with the strap in circuit with the lamp 15—15 these lamps will be illuminated to indicate the turn that the driver is about to make. A second pair of lamps 16—16 are each arranged at the front and rear ends of the vehicle as in the case of the lamps 15—15, and these lamps 16—16 are connected in circuit with the opposite end portion of the spiral strip, so that the contacts are moved into contact with the last mentioned portion of the strip, the lamps 16—16 will be illuminated to indicate the opposite movement of the vehicle.

As the contact bars 12 rise on the spiral strip 6, the converging formation of the same will result in the sliding of the contact door on the pair of U-shaped members 11—11.

While the preferred form of this invention has been illustrated and described herein, it is to be known that certain changes in the shape, size and materials may be resorted to, without departing from the spirit of the invention or the scope of the appended claim.

Having thus described the invention, what is claimed as new is:

In a switch for automobile direction signals comprising an annular support arranged around the usual steering column of an automobile, a spiral contact strip arranged on said support, said strip being provided with an insert of insulating material adapted to divide said strip into a pair of conductors, and a discular plate carried by the usual steering wheel, a U-shaped member depending from the bottom side of the plate and being disposed transversely across the convolutions of the spiral strip, a contact brush slidably mounted on said member and being adapted to normally engage with the insulating insert, and for wiping relation with the spiral strip when the steering wheel is rotated.

In testimony whereof I affix my signature.

DELOS A. MACE.